Nov. 14, 1950  E. ESSON  2,530,159
COOKSTOVE

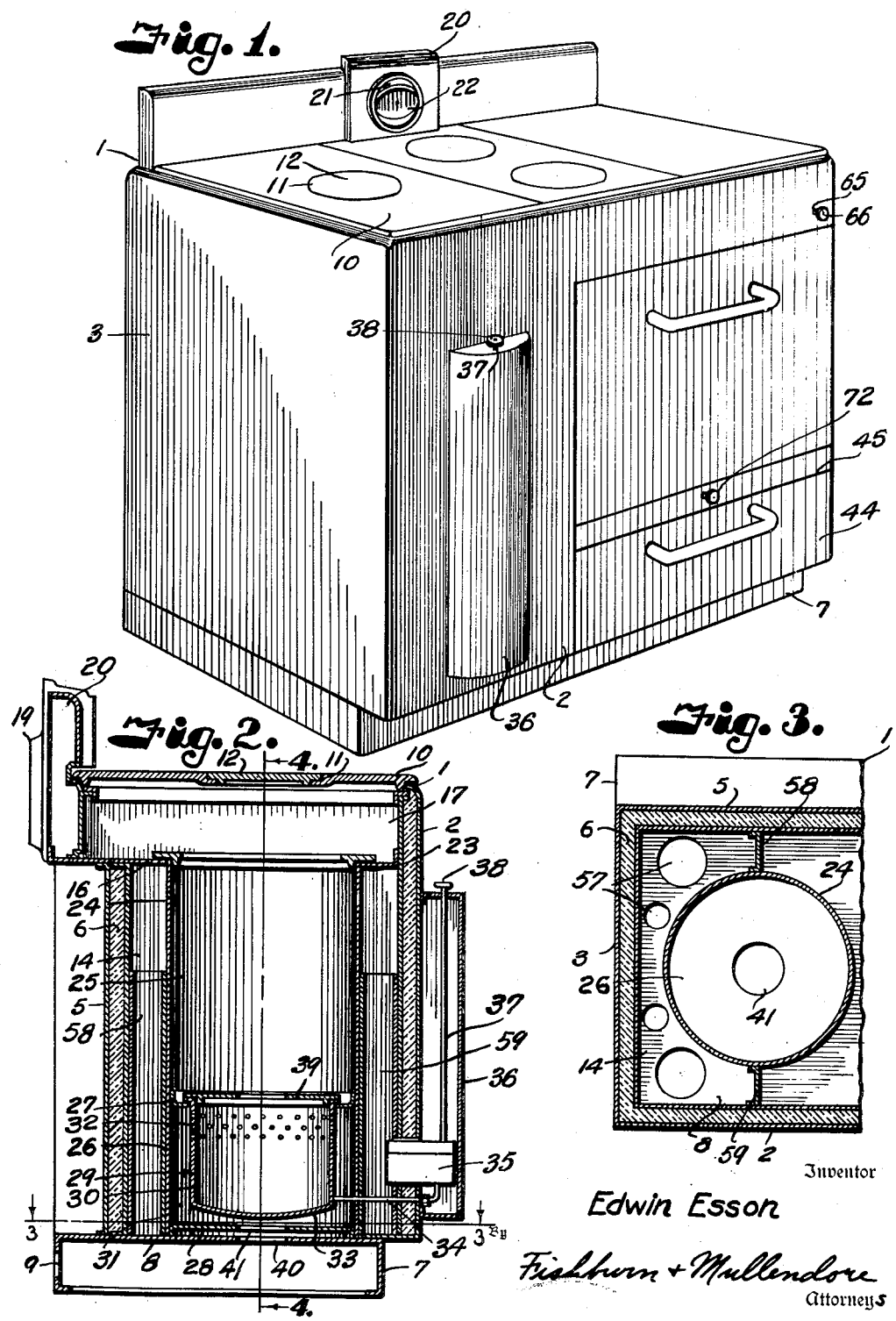

Filed April 7, 1947  2 Sheets-Sheet 2

Inventor
Edwin Esson
By Fishburn + Mullendore
Attorneys

Patented Nov. 14, 1950

2,530,159

UNITED STATES PATENT OFFICE 2,530,159

COOKSTOVE

Edwin Esson, Kansas City, Mo., assignor to Locke Stove Company, Kansas City, Mo., a corporation of Missouri Application April 7, 1947, Serial No. 739,754

4 Claims. (Cl. 126—1)

1

This invention relates to cook stoves having a cooking top and an oven heated by products of combustion evolved within a combustion chamber, the present invention being an improvement on the cook stove construction described in my co-pending application, Serial No. 683,590, filed July 15, 1946.

As disclosed in my co-pending application, the common method of heating the oven of a cook stove is to divert products of combustion so that they pass around the oven but this method is unsatisfactory because it is impossible to obtain the required temperature of the cooking top and at the same time maintain the desired oven temperature. It has also been difficult to distribute the travel of the hot gases of combustion about the walls of the oven so as to obtain substantially uniform baking temperatures within all portions of the oven. Another difficulty has been that the draft differential is not sufficient to maintain proper combustion when the products of combustion are used in heating the oven. A further objection is that the passageways around the oven accumulate soot which insulates the oven walls so that the passageways require frequent cleaning. These difficulties are intensified in stoves using liquid fuels.

It is, therefore, the purpose of the present invention to provide a cook stove structure wherein the products of combustion are at all times caused to travel under the cooking top to the flue outlet for maintaining the desired draft and cooking stove temperatures and to provide for heating of the oven by passing air, heated by the products of combustion under and through the oven and across the top thereof in such a manner as to maintain substantially uniform baking temperatures in all portions of the oven.

It is also an object of the invention to provide for passing preheated combustion air into the upper portion of the combustion chamber and to provide for positive flow of the oven heating air responsive to draft established through the flue connection of the stove.

Other objects are to provide means for packing heated air in the oven when the stove is operating under low fire and to provide for admission of unheated tempering air into the heated air prior to passage of the heated air into the oven.

Further objects of the invention are to provide a simple and inexpensive cook stove structure that is well adapted to be heated by liquid fuels.

In accomplishing these and other objects of the invention hereinafter pointed out, I have provided an improved structure which is illustrated in the accompanying drawings wherein:

2

Fig. 1 is a perspective view of a cook stove constructed in accordance with the present invention.

Fig. 2 is a vertical cross section through the stove on the line 2—2 of Fig. 4.

Fig. 3 is a fragmentary horizontal section through the burner pot chamber of the stove, the section being taken on the line 3—3 of Fig. 2.

Figure 4:
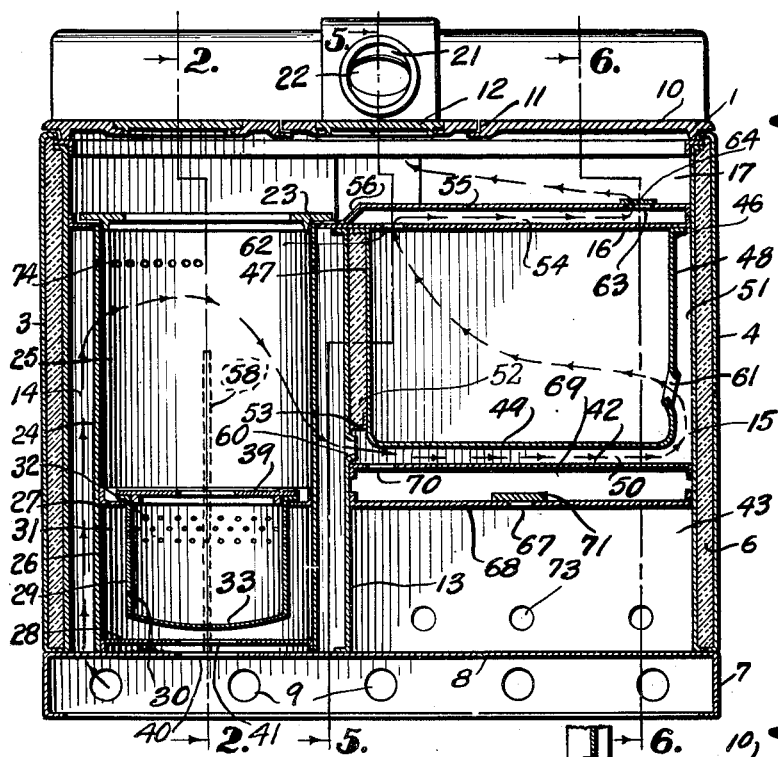
Fig. 4 is a longitudinal section through the stove.
Figure 5:
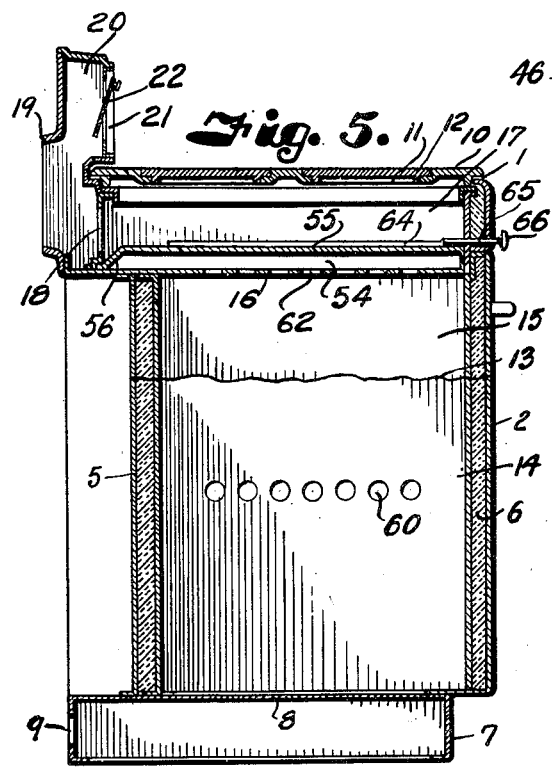
Fig. 5 is a vertical cross section through the stove on the line 5—5 of Fig. 4.
Figure 6:
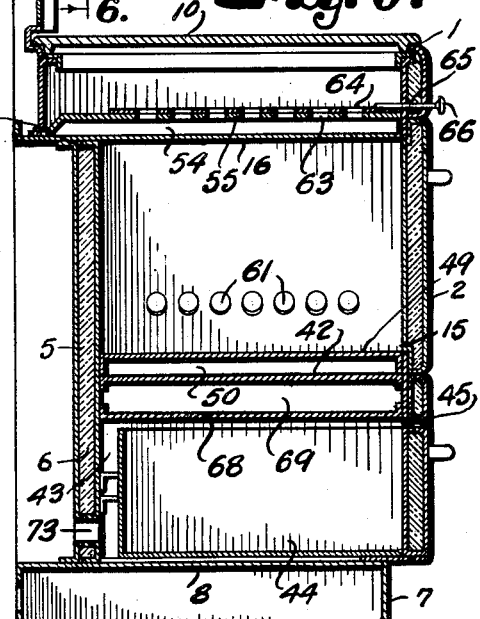
Fig. 6 is a cross section on the line 6—6 of Fig. 4.

Referring more in detail to the drawings:

1 designates a cook stove constructed in accordance with the present invention and which includes a casing having a front wall 2, side walls 3—4 and an inset back wall 5. The walls are preferably provided with insulation 6 to retain the heat evolved within the stove. The stove also includes a base 7 having a top 8 on which the walls of the stove are supported. The rear of the base has air inlet openings 9 for admitting combustion supporting air and air for heating of the oven of the stove as later described. The stove includes a cooking top 10 having openings 11 that are closed by lids 12 through which heat from the products of combustion is conducted to the cooking vessels placed thereover when the stove is in use. Extending transversely of the front and rear walls and spaced inwardly between the side wall is a vertical partition 13 dividing the interior of the casing into a heating compartment 14 and oven compartment 15. The upper end of the partition 13 connects with a horizontal partition 16 that is spaced below the cooking top to provide a horizontal passageway 17 under the cooking top for products of combustion that are caused to travel to an opening 18 located in the back of the stove and which is connected with a flue outlet connection 19 through a check draft chamber 20 that extends upwardly from the cooking top and is provided with an air inlet opening 21 controlled by a vane 22. The vane 22 is operated responsive to pressure differential between the check chamber and the air within the room in which the stove is installed, to admit air into the flue when the flue draft tends to increase flow of combustion supporting air to the burner of the stove. The vane or damper 22 is thus adapted to maintain automatically a predetermined draft differential on the respective sides of the burner for supplying the proper amount of combustion supporting air under variable flue pressures.

The partition 16 is provided over the heating compartment 14 with an opening 23. Supported on the top 8 of the base and connected with the partition 16 in encircling relation with the opening 23 is a clindrical casing 24 which is smaller in diameter than the width and depth of the heating compartment to provide an air heating space therearound. The interior of the cylinder is divided into a combustion chamber 25 and a burner chamber 26 by a ring 27 that is fixed to the wall at a point above the bottom 28. Suspended within the burner pot chamber is a burner pot 29 of standard type and which includes an annular wall 30 spaced inwardly from the wall of the casing 24 to provide a passageway 31 for flow of combustion supporting air to be distributed through a plurality of apertures 32 that are provided in the wall of the pot. The bottom 33 of the pot is dished downwardly to contain a body of liquid fuel that is fed into the pot through a supply pipe 34 under control of a constant level valve 35 that is mounted in the front of the stove and enclosed by a guard 36. The guard 36 extends upwardly and supports an adjusting rod 37 having a knob 38 by which the constant level control valve is adjusted to regulate the flow of fuel to the burner pot and thereby control the burning rate. The top of the burner pot carries a fire ring 39 for directing flame resulting from combustion of the fuel to the center of the combustion chamber 25 in heat exchange contact with the wall of the casing 24 and for discharge through the opening 23 into the passageway 17 for heating the cooking top. Combustion supporting air is admitted to the burner pot chamber through the base 7 by way of openings 40 and 41 in the top of the base and bottom of the burner pot chamber respectively.

The bottom of the oven section is formed by a horizontal partition 42 that extends across the space between the partition 13 and side wall 4 and from the front wall 2 to the rear wall 5. Located under the oven compartment is a drawer compartment 43 in which is mounted a drawer 44 that is removable through an opening 45 in the front wall 2 of the stove. The partition 42 may be of insulated construction to prevent loss of heat therethrough, however the partition as illustrated is not insulated.

Supported within the oven compartment is an oven 46 including side walls 47 and 48 positioned in spaced relation with the partition 13 and side wall 4 of the stove casing. The oven also includes a bottom 49 spaced above the partition 42 to provide a passageway 50 under the oven and which connects with a passageway 51 that is formed between the oven wall 48 and inner face of the side wall 4. The space 52 at the opposite side of the oven is closed at the bottom by an insert 53 and the space is filled with insulating material for insulating that wall of the oven from the direct heat of the combustion chamber. A passageway 54 is formed across the top of the oven by a horizontal partition 55 that is spaced above the partition 16. The passageway 54 is closed at the ends by flange 56 and its inner end and back and by the front and side walls 2 and 4 of the stove as best shown in Fig. 4.

Air is admitted to the heating space about the combustion chamber through a plurality of openings 57 that are provided in the base of the stove. The air is caused to move upwardly along one side of the combustion chamber by dividing the heating chamber on the front and rear sides of the casing 24 by partitions 58 and 59 that terminate short of the partition 16 to provide for movement of the air upwardly and then downwardly at the respective side of the sides of the combustion chamber to obtain the required heat required to maintain the maximum oven temperature. The heated air passes from the heating compartment through a row of openings 60 that connect the heating chamber with the passageway 50 so that heated air flows under the oven and up the passageway 51 to pack in the upper portion thereof. The air on packing the passageway 51 is discharged directly into the oven through a row of openings 61 that are formed in the oven wall 48 at a point near the interconnection of the passageways 50 and 51, the openings 61 being so formed that they direct the air upwardly toward the diagonal corner of the oven for discharge through a row of openings 62 into the passageway 54 across the top of the oven. The heated air on reaching the opposite side of the oven is discharged into the space 17 through a row of openings 63 in the partition 53 responsive to draft effected by the flue to which the stove is connected.

In order to control the flow of air through the oven for packing heated air in the oven when the burner pot is operated under low fire, the openings 63 may be controlled by a slide damper 64 that is actuated by a rod 65 extending through the front wall of the stove and which is provided with a knob 66.

Temperatures within the oven are controlled by admitting unheated air from the drawer compartment 43 through openings 67 in a transverse partition 68 that extends horizontally below the partition 42 to provide a passageway 69 which connects with the passageway 50 through openings 70 which are located near the inlet openings, the openings 67 being controlled by a damper 71 that is manipulated at the front of the stove by a knob 72. The air is supplied to the oven compartment through openings 73 at the back of the stove.

In order to admit preheated secondary air to the upper portion of the combustion chamber, the wall thereof is provided with a series of openings 74 on the upflow side of the partitions 58 and 59 as best shown in Fig. 4.

In using the stove constructed and assembled as described, the fuel is delivered to the burner pot by manipulating the adjusting knob 38 of the constant level control valve 35 so that the fuel flows into the burner pot 29 and collects in a pool on the dished bottom 33 thereof. The fuel is then ignited to start burning thereof. The primary air is supplied through the openings 9, 40 and 41 and is admitted into the burner pot 29 through the apertures 32 to support substantially complete combustion of the fuel; however, if any unburned products of combustion are discharged into the top of the combustion chamber they are caused to burn by the air admitted through the secondary air inlet openings 74. The hot products of combustion then pass through the passageway 17 under the cooking top 10 to heat the cooking top. During operation of the stove the vane 22 automatically adjusts itself responsive to variable flue conditions to maintain a substantially constant uniform draft through the burner pot for supplying the amount of combustion air necessary to maintain proper combustion of the fuel. If the oven 46 is not in use the damper 64 closes the openings 63. When the oven is to be used, the damper 64 is moved to uncover the openings 63 so that the flue draft is effective in producing the movement of air into the heating space of the heating compartment 14 for upflow along one side of the combustion chamber 25 and downflow at the other side so that the air is heated to a temperature required in raising the oven to the necessary baking temperatures. The heated air passes out of the heating compartment through the row of openings 60 into the passageway 50 for heating the bottom of the oven. The heated air after passing the bottom of the oven flows upwardly within the vertical passageway 51 to pack the space therein after which the heated air flows through the row of openings 61 into the oven for heating the interior thereof prior to discharge through the row of openings 62 into the top passageway 54 extending across the top of the oven. The air is discharged from the top passageway 54 through the row of openings 63 into the passageway 17 for discharge along with the products of combustion to the flue connection 19. The air flowing across the top of the oven serves to maintain top oven temperatures and also to prevent overheating by the products of combustion in the passageway 17. When the damper 64 controlling flow of heated air through the oven is open the vane 22 will automatically function so as to reduce the amount of air drawn through the opening 21 and thereby compensate for the additional air when the oven is in use.

To maintain a predetermined oven temperature the damper 71 is shifted to uncover the openings 67 and admit tempering air into the passageway 69 for discharge through the openings 70 into the stream of heated air moving through the passageway 50. The tempering air is thus mixed with the hot air before admission to the oven through the openings 61.

The circulation of heated air as above described provides for substantially uniform temperatures in all portions of the oven and provides for successful operation of the stove for baking purposes when the stove is equipped for burning liquid fuels. The structure also provides for maintaining adequate cooking top temperatures when the oven is in use because all of the products of combustion are passed directly into the heating space under the cooking top, the only loss being the heat absorbed in bringing the oven air to the desired temperature.

From the foregoing it is obvious that I have provided a simple and relatively inexpensive stove structure that is well adapted for burning liquid fuels.

What I claim and desire to secure by Letters Patent is:

1. A cook stove including a casing having an oven and air heating compartments, a heating unit in the heating compartment including a casing spaced from walls of the heating compartment, a flue connection for the stove having flow connection with the heating unit for discharging products of combustion from the heating unit and for producing a draft through the flue connection when the stove is in operation, partitions cooperating with the heating unit casing to provide an upflow heating space on one side of the heating unit and a downflow heating space on the other side, an oven in the oven compartment having a bottom and a side wall remote from the heating compartment in spaced relation with the corresponding bottom and side wall of said oven compartment for providing a bottom passageway under the oven and an interconnected passageway at said side of the oven, said downflow space of the heating compartment having a flow connection with the bottom passageway and said oven having a flow connection with said side passageway adjacent the interconnection of said bottom and said side passageways and a flow outlet at the opposite diagonal corner of the oven, and means forming a passageway over the top of the oven in connection with said outlet and having an outlet at the opposite end in connection with said flue connection to effect movement of heated air from the heating compartment in heating relation to the oven.

2. A cook stove including a casing having an oven and air heating compartments, a heating unit in the heating compartment including a casing spaced from walls of the heating compartment, a flue connection for the stove having flow connection with the heating compartment for discharging products of combustion from the heating unit and for producing a draft through the flue connection when the stove is in operation, partitions cooperating with the heating unit casing to provide an upflow heating space on one side of the heating unit and a downflow heating space on the other, an oven in the oven compartment having a side wall spaced from the side wall of the oven compartment adjacent the heating compartment to provide an insulation space between said oven compartment and the downflow heating space and having a bottom and opposite side wall spaced from the bottom and corresponding side wall of the oven compartment to provide a bottom passageway and an interconnected vertical passageway at the side of the oven remote from the heating compartment, said downflow heating space having an air inlet into the bottom passageway below said insulating space and said oven having connection with said bottom and vertical passageways adjacent the interconnection of said passageways and having an outlet in the opposite diagonal corner of the oven, means forming a passageway across the top of the oven in connection with said outlet and said flue connection to effect movement of heated air from the heating compartment, through the bottom passageway, through the oven, and through the top passageway for heating said oven.

3. A cook stove including a casing having an oven and air heating compartments, a heating unit in the heating compartment including a casing spaced from walls of the heating compartment, a flue connection above the oven compartment, means forming a passageway across the top of said compartments to connect directly the heating compartment with the flue connection for discharging products of combustion from the heating unit and for producing a draft through the flue connection when the stove is in operation, partitions cooperating with the heating unit casing to provide an upflow heating space on one side of the heating unit and a downflow heating space on the other, an oven in the oven compartment having a side wall spaced from the side wall of the oven compartment adjacent the heating compartment to provide an insulation space between said oven compartment and the downflow heating space and having a bottom and opposite side wall spaced from the bottom and corresponding side wall of the oven compartment to provide a bottom passageway and an interconnected vertical passageway at the side of the oven remote from the heating compartment, said insulation space being closed from the bottom passageway, said downflow heating space having an air inlet into the bottom passageway below said insulating space and said oven having connection with said bottom and vertical passageways adjacent the interconnection of said passageways in a lower corner of the oven remote from the heating space and having an outlet in the opposite diagonal corner of the oven, means forming a passageway across the top of the oven below the passageway for the hot products of combustion and in connection with said outlet and said flue connection to effect movement of heated air from the heating compartment, through the bottom passageway, through the oven, and through the top passageway for heating said oven, and means for controlling flow of heated air through the oven.

4. A cook stove including a casing having an oven and air heating compartments, a heating unit in the heating compartment, a flue connection for the stove having a duct flow connection with the heating unit through a passageway extending across the top of the oven compartment for discharging products of combustion from the heating unit and for producing a draft through the flue connection when the stove is in operation, an oven in the oven compartment having a side wall spaced from the side wall of the oven compartment adjacent the heating compartment to provide an insulation space between said compartments and having a bottom and opposite side wall spaced from the bottom and corresponding side wall of the oven compartment to provide a bottom passageway and an interconnected vertical passageway at the side of the oven remote from the heating compartment, said heating compartment having an air inlet into the bottom passageway below said insulating space and said oven having connection with said passageways adjacent the interconnection of said passageways and having an outlet in the opposite diagonal corner of the oven, means forming a passageway across the top of the oven and below said first-named passageway in connection with said outlet and said flue connection through said first-named passageway to effect movement of heated air from the heating compartment through the bottom passageway, through the oven and through the top passageway for heating said oven, means having connection with the bottom passageway for admitting tempering air into the bottom passageway, means for controlling the amount of tempering air to regulate temperature of the heated air from the heating compartment, and a damper for controlling flow of air from the oven compartment.

EDWIN ESSON.

REFERENCES CITED

The following references are of record in the file of this patent:

UNITED STATES PATENTS

| Number | Name | Date |
|---|---|---|
| 28,081 | Henderson | May 1, 1860 |
| 38,423 | Shear | May 5, 1863 |
| 90,850 | Keep | June 1, 1869 |
| 125,377 | Burke | Apr. 9, 1872 |
| 181,634 | Burke | Aug. 29, 1876 |
| 301,608 | Johnstone | July 8, 1884 |
| 515,515 | Butts | Feb. 27, 1894 |
| 900,821 | Berry | Oct. 13, 1908 |
| 1,757,987 | Whittier | May 13, 1930 |
| 2,224,534 | Breese | Dec. 10, 1940 |
| 2,330,495 | Karges | Sept. 28, 1943 |
| 2,417,842 | Sanford et al. | Mar. 25, 1947 |